Dec. 27, 1960 W. MARKERT, JR 2,966,571
METHOD AND APPARATUS FOR SEALING THE ENDS OF TUBES
Filed Sept. 28, 1956 2 Sheets-Sheet 1
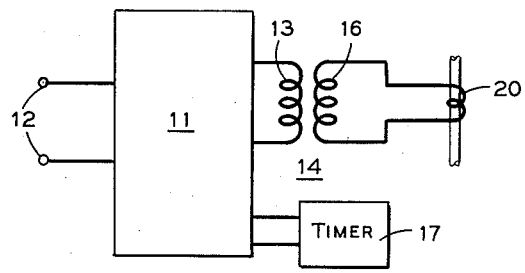
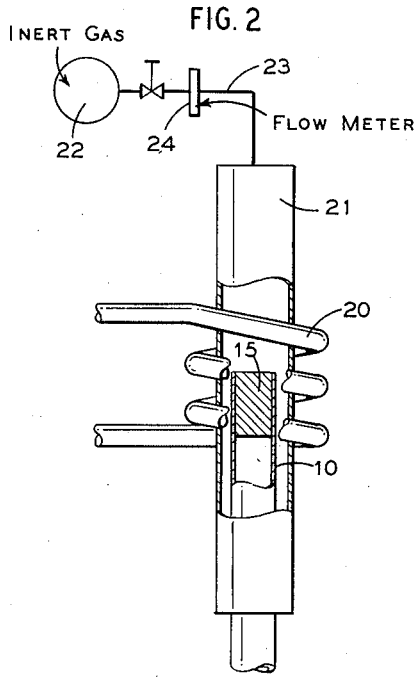
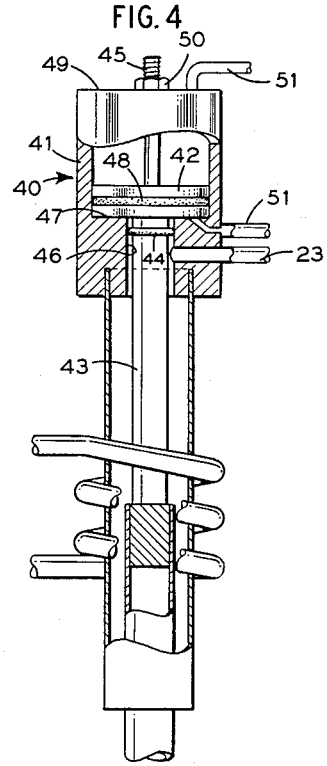
INVENTOR.
Wallace Markert, Jr.
BY
ATTORNEY Dec. 27, 1960   W. MARKERT, JR   2,966,571
METHOD AND APPARATUS FOR SEALING THE ENDS OF TUBES
Filed Sept. 28, 1956   2 Sheets-Sheet 2

INVENTOR.
Wallace Markert, Jr.
BY
ATTORNEY

United States Patent Office 2,966,571
Patented Dec. 27, 1960

2,966,571

METHOD AND APPARATUS FOR SEALING THE ENDS OF TUBES

Wallace Markert, Jr., Alliance, Ohio, assignor to The Babcock & Wilcox Company, New York, N.Y., a corporation of New Jersey Filed Sept. 28, 1956, Ser. No. 612,678

13 Claims. (Cl. 219—9.5)

This invention relates to the end sealing of metallic tubes and, more particularly, to a novel method of and apparatus for induction welding end closures in sealing relation in the ends of tubes.

There are many instances occurring during the fabrication of various components where it is necessary to seal the ends of metallic tubes by a welding process in such a manner that the resulting seal is absolutely leak tight. Frequently, a necessary additional requirement is the maintenance of the dimensional accuracy of the tube ends.

It is furthermore often desirable that the sealing operation be adapted for remote control and rapidity of sealing.

A particular, but by no means limiting example, is in the formation of fuel elements for atomic reactors. In such applications, the fissionable material must be sealed in a leak tight container so that none of the fission products can escape from the container. This is particularly important in situations where the fuel elements are immersed in a coolant which is heated by the heat developed due to fission and thereby cools the fuel elements as well as provides heat energy for useful purposes, such as production of steam or power generation. The coolant is circulated into and out of the shielded structure in which the fuel elements are disposed and any leakage of the products of fission into the coolant would be dangerous.

In a particular example, the fissionable material is contained within stainless steel tubes sealed at each end by stainless steel plugs. These sealed tubes containing the fissionable material are arranged in sets or banks maintained in contact with the coolant within the shielded structure.

Various arrangements have been proposed and tried for sealing metallic tubes in a leak tight manner, for example the various methods of inert gas shielded fusion welding. However, with the usual arc type of welding, whether inert gas shielded or not, and with oxy-fuel gas welding, the weld produced, in the case of securing sealing plugs in a leak tight manner in the ends of small diameter tubes, have been unsatisfactory from the standpoint of providing a completely leak tight seal. In addition, methods of welding used heretofore for welding these end plugs into small diameter tubes have not been well adapted to remote control or rapid operation.

In accordance with the present invention, it has been found that metal plugs may be welded in leak tight relation in the ends of small diameter metal tubes by an induction welding procedure in which an inert gas is caused to flow over the end of the plug and the external surface of the tube during application of high frequency electric energy thereto. More specifically, the end cap or plug and the tube are so arranged that the closure has a light push fit in the tube end. The tube, with the end closure in place, is then inserted within a larger diameter tube of material unaffected by induction heating (such as quartz, for example), the induction heating coil being in surrounding relation to the outer tube. The closed end of the tube is extended a pre-determined amount into the field of the coil, depending upon the tube thickness and diameter.

The heating coil is energized from a high frequency generator which is timer-controlled to provide a pre-determined heating period again related to the physical measurements of the tube and end closure. Before energizing the high frequency generator, a flow of inert gas is established downwardly through the outer tube and out through its end, thus flushing atmospheric air from the outer tube, and with the inert gas flowing over the closure and around the tube to be sealed. The rate of flow of this gas must be carefully pre-determined and controlled to obtain a pre-determined cooling rate of the tube to be sealed. In setting the gas flow rate, consideration has to be given to the heat absorption characteristics and heat transfer characteristics of the inert gas which may be, for example, helium or argon.

In following the aforementioned procedure, it has been found that the resultant article comprises a tube having its end portion sealed in substantially full surface to surface relation with the entire circumferential surface of the sealing plug or closure, a good metallic bond being provided over substantially all of the plug surface. Also by proper selection of the duration of the heating time, of the extent of the tube into the inductive heating coil, and of the rate of flow of the inert gas, the aforementioned surface-to-surface seal is obtained without any appreciable effect on the dimensional accuracy of the shielded tube end.

For an understanding of the invention principles, reference is made to the following description of typical embodiments thereof as illustrated in the accompanying drawings. In the drawings:

Fig. 1 is a schematic diagram of the electrical elements of the invention apparatus;

Fig. 2 is an enlarged vertical sectional view through the outer tube, the induction heating coil, and the tube to be sealed, the inert gas flow means being schematically illustrated;

Figure 3:
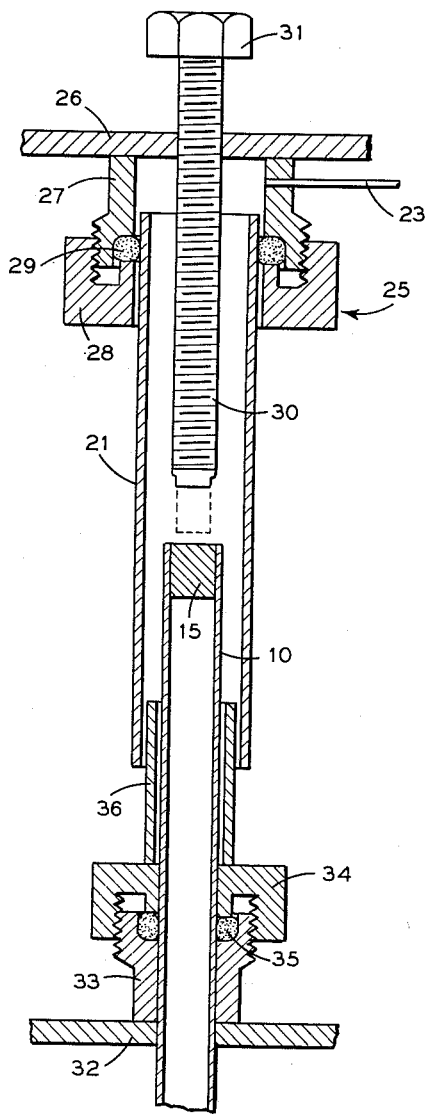
Fig. 3 is an enlarged vertical or axial sectional view illustrating, more particularly, one form of gauging device for properly positioning the tube end to be sealed within the heating coil; and, Fig. 4 is a sectional view showing a preferred form of gauging device.

Referring to the drawing, the electrical apparatus for induction welding of a stainless steel closure, such as a plug 15, into sealing relation in the end of a stainless steel tube 10, is illustrated as including a suitable high frequency electrical generator 11 which may, for example, be a high frequency oscillator operated at from 350–750 kc. Generator 11 is schematically illustrated as supplied with electric energy from a suitable source thereof connected to input terminals 12, and the output of generator 11 is illustrated as connected to the primary 13 of an impedance matching transformer 14 having its secondary 16 connected to opposite ends of an induction heating coil 20. Coil 20 may, for example, comprise three turns of suitable electrically conductive tubing. A suitable timer, such as an electronic interval timer 17 is illustrated as connected to generator 11 to control the duration of the flow of high frequency energy from generator 11 to coil 20.

Referring more specifically to Fig. 2, coil 20 is disposed around an outer or gas conducting tube 21 of material which is not affected by high frequency electric energy. For example, tube 21 may be a relatively elongated quartz tube having an internal diameter appreciably larger than the external diameter of worktube 10. A source 22 of an inert gas, such as argon or helium, is illustrated as connected by a line 23 to discharge the inert gas into the upper end of tube 21 for flow downwardly therethrough in heat transfer and shielding contact with the outer ends of tube 10 and plug 15 and with the outer surface of tube 10. A flow meter 24 is indicated as connected in line 23 so as to regulate and measure the rate of flow of the inert gas.

In practicing the method of the invention, plug 15 is pressed in the end of tube 10 with a light push fit. To obtain such fit, it may, in some instances, be necessary to use a drift to size the inner diameter of tube 10 for the length engaged by plug 15. Plug 15 may have its outer end flush with the outer end of tube 10, or may project slightly therebeyond. With larger diameter tubes it has been found preferable to have the plug end extend slightly beyond the tube end to provide a greater surface area of the plug in contact with the inert gas.

Tube 10, with plug 15 thus inserted therein, is then inserted a pre-determined distance upwardly of tube 21 and into coil 20. The flow of inert gas is then started and controlled at a given rate by flow meter 24. The inert gas flushes the interior of tube 21 and, by virtue of discharging through the lower end of this tube, inhibits entry of the atmospheric air into tube 21. Timer 17 is then started to initiate the flow of high frequency energy into coil 20, the timer interrupting the flow of high frequency energy after an accurately pre-determined time interval. The end of tube 10 and plug 15, being disposed within the high frequency field of coil 20, are rapidly heated to a welding temperature so that a surface-to-surface weld, which is leak tight, is formed between substantially the entire circumferential surface of plug 15 and the contacting inner surface of tube 10. The other end of the tube, after the tube has been filled in any desired manner, is then similarly sealed.

Fig. 3 illustrates one form of gauge for presetting the extent to which tube 10 and plug 15 are inserted into the field of coil 20. In Fig. 3, the same parts as in Figs. 1 and 2 have been given the same reference characters.

Referring to Fig. 3, quartz tube 21 is clamped, by a clamping device 25, to a fixed upper support 26. Clamping device 25 comprises a threaded nipple 27 sealed at its upper end to support 26, a clamping nut 28 threaded on nipple 27, and a sealed gasket 29 compressed by nut 28 into firm sealing engagement with tube 21.

The gauging device comprises a threaded shaft 30 which is threaded through support 26 to extend axially of tube 21, and provided with a nut 31 or the like for gauging the extent of shaft 30 within tube 21. Shaft 30 is adjusted, as to its extent in tube 21, in accordance with the size and other characteristics of the particular tube 10 to be sealed.

The worktube 10, having the cap or plug 15 therein, is inserted upwardly through an aperture in a lower support 32 having a threaded nipple 33 on its upper surface cooperable with a nut 34 for selectively compressing a gasket 35 against tube 10. An intermediate short tube 36 extends upwardly from nut 34 between tube 10 and tube 21.

In using the device of Fig. 3, nut 34 is loosened and tube 10 with plug 15 therein is pushed up until the plug engages the inner end of shaft 30. Nut 34 is then tightened to compress gasket 35 against tube 10, and gauge shaft 30 is then operated to withdraw its inner end out of the field of load coil 20. The inert gas is then supplied through the line 23 which is connected into nipple 27, and the welding operation is effected in the same manner as described.

Fig. 4 shows the upper end of an alternative form of gauging device, the same reference characters being used to designate the parts illustrated in Figs. 1 through 4. In this case, the upper end of tube 21 is sealingly secured in the lower end of a hydraulic ram 40. Ram 40 includes a cylinder 41 and a piston 42 having a piston rod 43 extending downwardly therefrom through a relatively larger diameter opening 46 in the lower end of wall 47 of cylinder 41. A gasket 44 is disposed between rod 43 and the inner surface of opening 46, and piston 42 is provided with a sealing gasket 48. Inert gas line 23 is connected through the wall of cylinder 41 in communication with opening or passage 46. Lines 51 connect the interior of cylinder 41 above and below piston 42 to a suitable source of fluid under pressure. Gauge rod 45 is secured to the upper surface of piston 42 and extends in sealing relation through the upper wall 49 of cylinder 41, with its end beyond the cylinder being threaded to receive a nut 50. Adjustment of nut 50 determines the amount of movement of rod 43 into the field of coil 20.

In operation, pressure fluid is admitted above piston 42 and exhausted from beneath the piston to move rod 43 down to the limit provided by adjustment of nut 50 on gauge rod 45. Tube 10, with plug 15 in the upper end thereof is then inserted in the same manner as described in Fig. 3 until plug 15 abuts rod 43. Pressure is then applied beneath piston 42 and exhausted from above the piston to withdraw the lower end of rod 43 out of the field of load coil 20. The flow of inert gas is then started and the welding operation is performed in the same manner as previously described.

While the invention has been described more particularly as to the seal welding of a stainless steel plug in a stainless steel tube, this description is exemplary only, as other metallic materials may be used for the tube and plug. The invention has been successfully applied to the sealing of tubes ranging from 1/8" to 1/2" in diameter with wall thicknesses of 0.007 to 0.028". For welding this size of tubing, a coil 20 consisting of three turns of 1/8" copper tubing has been found satisfactory.

Among other critical features of the operation is the positioning of the worktube and plug not only longitudinally within the field of coil 20, but also axially thereof, although the axial position of the tube in the coil is not as critical as is the longitudinal extent of the worktube into the coil. The inert gas flow over the plug and tube cools the outer surfaces of the tube and plug within the induction coil and thereby prevents these surfaces from melting, which would normally occur with high frequency heating due to most of such heating being supplied to the outer surfaces. The maximum temperature thus occurs somewhat below the outer surface and, by proper correlation of physical dimensions, power input, frequency, and gas flow rate, the zone of maximum temperature can be shifted to the contacting surfaces of the plug and tube. This is important in forming the weld at the proper place and in maintaining dimensional accuracy of the sealed end. When using stainless steel tubes, the only surface preparation necessary is degreasing, for example, by trichloroethylene. However, with material other than stainless steel, surface preparation in addition to degreasing may be necessary. The invention is applicable to either solid end caps, as illustrated, or to cup shape end caps. Successful results have also been obtained with various forms of tapered and slotted end caps projecting considerably from the tube end. With the particular size tubes mentioned by way of example, the end caps have a length of approximately 1/4". The heating time varies from approximately two seconds for a 1/8" diameter tube to approximately twenty seconds for the 1/2" diameter tube. Subsequent to the welding, the welded parts are kept in an inert gas stream for a sufficient time to allow these parts to cool to such an extent as will not produce undesirable oxidation.

While specific embodiments of the invention have been shown and described in detail to illustrate the application of the invention principles, it will be understood that the invention may be embodied otherwise without departing from such principles.

What is claimed is:

1. The method of sealing the end of a metallic tube comprising the steps of inserting an axial elongated metallic closure into an end of the tube with a close axially elongated surface contact fit therein; establishing a flow of inert gas through a laterally confined zone surrounding the thus closed end of the metallic tube to exclude atmospheric air and extract heat from the exposed surfaces of the tube and closure; and, while maintaining such flow of inert gas, establishing a high frequency electric heating field in the closure and such one end of the tube to fuse the inner surface of such one end of the tube to the contacting surface of the closure to form a leak tight weld between and substantially coextensive with such surfaces.

2. The method of sealing the end of a metallic tube comprising the steps of inserting an axial elongated metallic closure into an end of the tube with a close axially elongated surface contact fit therein; establishing a flow of inert gas through a laterally confined zone surrounding the thus closed end of the metallic tube to exclude atmospheric air and extract heat from the exposed surfaces of the tube and closure; while maintaining such flow of inert gas, establishing a high frequency electric heating field in the closure and such one end of the tube to fuse the inner surface of such one end of the tube to the contacting surface on the closure to form a leak tight weld between and substantially coextensive with such surfaces; and interrupting said field after a predetermined heating interval correlated with the physical characteristics of the tube and closure.

3. The method of sealing the end of a metallic tube comprising the steps of inserting an axially elongated metallic closure into an end of the tube with a light push fit therein; flowing inert gas, at a rate correlated with the physical characteristics of the tube and closure, through a laterally confined zone surrounding the thus closed end of the metallic tube to exclude atmospheric air and extract heat from the exposed surfaces of the tube and closure; and while maintaining such flow of inert gas, establishing a high frequency electric heating field in the closure and such one end of the tube to fuse the inner surface of such one end of the tube to the contacting surface of the closure to form a leak tight weld between and substantially coextensive with such surfaces.

4. The method of sealing the end of a metallic tube comprising the steps of inserting an axially elongated metallic closure into an end of the tube with a light push fit therein; flowing inert gas, at a rate correlated with the physical characteristics of the tube and closure and the heat absorption and transfer characteristics of the gas, through a laterally confined zone surrounding the thus closed end of the metallic tube to exclude atmospheric air and extract heat from the exposed surfaces of the tube and closure; and, while maintaining such flow of inert gas, establishing a high frequency electric heating field in the closure and such one end of the tube to fuse the inner surface of such one end of the tube to the contacting surface of the closure to form a leak tight weld between and substantially coextensive with such surfaces.

5. The method of sealing the end of a metallic tube comprising the steps of inserting an axially elongated metallic closure into an end of the tube with a light push fit therein; flowing inert gas, at a rate correlated with the physical characteristics of the tube and closure and the heat absorption and transfer characteristics of the gas, through a laterally confined zone surrounding the thus closed end of the metallic tube to exclude atmospheric air and extract heat from the exposed surfaces of the tube and closure; while maintaining such flow of inert gas; establishing a high frequency electric heating field in the closure and such one end of the tube to fuse the inner surface of such one end of the tube to the contacting surface of the closure to form a leak tight weld between and substantially coextensive with such surfaces; and interrupting said field after a predetermined heating interval correlated with the physical characteristics of the tube and closure.

6. The method of sealing the end of a metallic tube comprising the steps of mounting an induction heating coil, connected to a high frequency electric generator, on a relatively elongated and large diameter tube of material unaffected by a high frequency electric heating field having an internal diameter greater than the external diameter of the metallic tube to be sealed, and intermediate the ends of said larger diameter tube; inserting an axially elongated metallic closure into an end of the metallic tube with a light push fit therein; inserting the metallic tube, closed end first, into said larger diameter tube and axially into the zone of said coil; establishing a flow of inert gas through the outer tube to flush atmospheric air therefrom and to exclude atmospheric air and extract heat from the exposed surfaces of the metallic tube and closure; and, while maintaining such flow of inert gas, activating said generator to energize said coil to establish a high frequency electric heating field in the closure and such one end of the metallic tube to fuse the inner surface of such one end of the metallic tube to the contacting surface of the closure to form a leak tight weld between and substantially coextensive with such surfaces.

7. The method of sealing the end of a metallic tube comprising the steps of mounting an induction heating coil, connected to a high frequency electric generator, on a relatively elongated and large diameter tube of material unaffected by a high frequency electric heating field having an internal diameter greater than the external diameter of the metallic tube to be sealed, and intermediate the ends of said larger diameter tube; inserting an axially elongated metallic closure into an end of the metallic tube with a light push fit therein; inserting the metallic tube, closed end first, into said larger diameter tube in coaxial spaced relation therewith and axially into the zone of said coil to an extent correlated with the physical characteristics of the metallic tube and closure; establishing a flow of inert gas, at a rate correlated with the physical characteristics of the metallic tube and closure and the heat absorption and transfer characteristics of the gas, through the outer tube to flush atmospheric air therefrom and to exclude atmospheric air and extract heat from the exposed surfaces of the metallic tube and closure; while maintaining such flow of inert gas, activating said generator to energize said coil to establish a high frequency electric heating field in the closure and such one end of the metallic tube to fuse the inner surface of such one end of the metallic tube to the contacting surface of the closuer to form a leak tight weld between and substantially coextensive with such surfaces; and deactivating said generator to interrupt said field after a predetermined heating interval correlated with the physical characteristics of the metallic tube and closure.

8. The method defined in claim 7 in which said large diameter tube is a quartz tube.

9. The method defined in claim 7 in which said large diameter tube is a quartz tube and extends beyond the end of the metallic tube.

10. Apparatus for sealing the end of a metallic tube by forming a leak-tight weld between the inner surface of the end portion of the tube and the contacting surface of a metallic closure inserted in such end portion with a close surface contact fit therein; said apparatus comprising, in combination, a relatively elongated tube of material unaffected by a high frequency electric heating field having an internal diameter greater than the external diameter of the metallic tube to be sealed; an induction heating coil embracing said larger diameter tube; the metallic tube being insertable into said larger diameter tube, closed end first, in coaxial spaced relation therewith and axially into the zone of said coil to an extent correlated with the physical characteristics of the metallic tube and closure; a source of inert gas in communication with an end of said larger diameter tube for discharge of inert gas therethrough to flush atmospheric air therefrom and to exclude atmospheric air and extract heat from the exposed surfaces of the metallic tube and closure; flow metering means controlling the rate of flow of inert gas through said large diameter tube to a valve correlated with the physical characteristics of the metallic tube and closure; a high frequency electric generator; means connecting the output of said generator to said coil to establish a high frequency electric heating field in the closure and such one end of the metallic tube, while the inert gas is flowing through said larger diameter tube, to fuse the inner surface of such one end of the metallic tube to the contacting surface of the closure to form a leak tight weld between such surfaces; timer means operable, upon activation of said generator, to control the duration of operation thereof to a predetermined interval correlated with the physical characteristics of the metallic tube and closure; and guage means extendable axially of said larger diameter tube into said coil for abutment by the closed end of the metallic tube to limit the extent of the latter into said coil.

11. Apparatus as claimed in claim 10 in which said large diameter tube is a quartz tube.

12. Apparatus as claimed in claim 10 in which said gage means comprises a shaft threaded through a fixed support.

13. Apparatus as claimed in claim 10 in which said gage means comprises a hydraulic actuator having a piston rod extendable into said coil; and means adjustably limiting extension of said rod.

References Cited in the file of this patent

UNITED STATES PATENTS

| | | |
|---|---|---|
| 2,349,835 | Strickland | May 30, 1944 |
| 2,372,413 | Weightman | Mar. 27, 1945 |
| 2,470,074 | Manning | May 10, 1949 |
| 2,510,207 | Behnke et al. | June 6, 1950 |
| 2,625,637 | Garner et al. | Jan. 13, 1953 |
| 2,630,513 | Redmond | Mar. 3, 1953 |
| 2,649,527 | Chapman et al. | Aug. 18, 1953 |

FOREIGN PATENTS

| | | |
|---|---|---|
| 385,285 | Great Britain | Mar. 17, 1931 |